United States Patent
Fujishiro et al.

(10) Patent No.: US 12,010,753 B2
(45) Date of Patent: Jun. 11, 2024

(54) COMMUNICATION CONTROL METHOD AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 315 days.

(21) Appl. No.: 17/399,624

(22) Filed: Aug. 11, 2021

(65) Prior Publication Data

US 2021/0378048 A1 Dec. 2, 2021

Related U.S. Application Data

(63) Continuation of application No. PCT/JP2020/005387, filed on Feb. 12, 2020.

(60) Provisional application No. 62/804,306, filed on Feb. 12, 2019.

(51) Int. Cl.
*H04W 76/27* (2018.01)
*H04W 76/32* (2018.01)

(52) U.S. Cl.
CPC ........... *H04W 76/27* (2018.02); *H04W 76/32* (2018.02)

(58) Field of Classification Search
CPC .............................. H04W 76/15; H04H 20/38
USPC ................... 370/331, 329; 455/449
See application file for complete search history.

(56) References Cited

U.S. PATENT DOCUMENTS

| 8,520,502 | B2 | 8/2013 | Tenny et al. | |
|---|---|---|---|---|
| 2017/0245213 | A1* | 8/2017 | Martinez Tarradell | H04W 24/02 |
| 2018/0213452 | A1* | 7/2018 | Kim | H04W 36/0088 |
| 2022/0361087 | A1* | 11/2022 | Kim | H04W 48/14 |

FOREIGN PATENT DOCUMENTS

JP 2011-523299 A 8/2011

* cited by examiner

*Primary Examiner* — Kiet M Doan
(74) *Attorney, Agent, or Firm* — Studebaker & Brackett PC

(57) ABSTRACT

A communication control method according to one embodiment is a method in a mobile communication system. The communication control method includes receiving, by a user equipment in a Radio Resource Control (RRC) connected mode, an RRC release message from a base station, the RRC release message including a condition for releasing or suspending an RRC connection, performing, by the user equipment, data communication with the base station until the condition is met even in a case of receiving the RRC release message, and transitioning the user equipment to an RRC idle mode or an RRC inactive mode when the condition is met.

12 Claims, 10 Drawing Sheets

COMMUNICATION CONTROL METHOD AND USER EQUIPMENT

RELATED APPLICATIONS

The present application is a continuation based on PCT Application No. PCT/JP2020/005387, filed on Feb. 12, 2020, which claims the benefit of U.S. Provisional Patent Application No. 62/804,306 filed on Feb. 12, 2019. The content of which is incorporated by reference herein in their entirety.

TECHNICAL FIELD

The present disclosure relates to a communication control method and a user equipment in mobile communication systems.

BACKGROUND ART

Currently, in the 3rd Generation Partnership Project (3GPP) which is a standardization project for mobile communication systems, as modes for Radio Resource Control (RRC) for a user equipment, an RRC connected mode, an RRC inactive mode, and an RRC idle mode have been specified.

The RRC connected mode and the RRC inactive mode are modes in which an RRC connection for a user equipment is established. However, the RRC inactive mode is a mode in which an established RRC connection is suspended. The RRC idle mode is a mode in which an RRC connection for the user equipment is not established.

The user equipment in the RRC idle mode or the RRC inactive mode needs to monitor a downlink control channel only in a cyclic paging occasion, and thus, power consumption of the user equipment is small. On the other hand, the user equipment in the RRC connected mode needs to frequently monitor at least the downlink control channel in order to perform data communication, and the power consumption of the user equipment is large.

Thus, there is a demand for realizing a technique in which a user equipment can appropriately transition from an RRC connected mode to an RRC idle mode or an RRC inactive mode in order to reduce the power consumption of the user equipment.

SUMMARY OF INVENTION

A communication control method according to one embodiment is a method in a mobile communication system. The communication control method includes receiving, by a user equipment in a Radio Resource Control (RRC) connected mode, an RRC release message from a base station, the RRC release message including a condition for releasing or suspending an RRC connection, performing, by the user equipment, data communication with the base station until the condition is met even in a case of receiving the RRC release message, and transitioning the user equipment to an RRC idle mode or an RRC inactive mode in a case where the condition is met.

A user equipment according to one embodiment is an apparatus in a mobile communication system. The user equipment includes a receiver configured to receive, in an RRC connected mode, an RRC release message from a base station, the RRC release message including a condition for releasing or suspending an RRC connection, and a controller configured to perform data communication with the base station until the condition is met even in a case of receiving the RRC release message. The controller is configured to make the user equipment transition to an RRC idle mode or an RRC inactive mode when the condition is met.

A communication control method according to one embodiment is a method in a mobile communication system. The communication control method includes receiving, by a user equipment in a Radio Resource Control (RRC) connected mode, an RRC release message from a base station indicating suspension of an RRC connection, transitioning the user equipment to an RRC inactive mode in response to receiving the RRC release message, and transitioning the user equipment in the RRC inactive mode autonomously to an RRC idle mode in a case where a predetermined condition is met.

A user equipment according to one embodiment is an apparatus in a mobile communication system. The user equipment includes a receiver configured to receive, in a Radio Resource Control (RRC) connected mode, an RRC release message from a base station, the RRC message indicating suspension of an RRC connection, and a controller configured to make the user equipment transition to an RRC inactive mode in response to receiving the RRC release message. The controller is configured to autonomously make the user equipment transition from the RRC inactive mode to an RRC idle mode in a case where a predetermined condition is met.

DESCRIPTION OF EMBODIMENTS

A mobile communication system according to an embodiment will be described with reference to the drawings. In the description of the drawings, the same or similar parts are designated with the same or similar reference signs.

Mobile Communication System

First, a configuration of a mobile communication system according to an embodiment will be described. While the mobile communication system according to one embodiment is a 3GPP 5G system, Long Term Evolution (LTE) may be at least partially applied to the mobile communication system.

Figure 1:
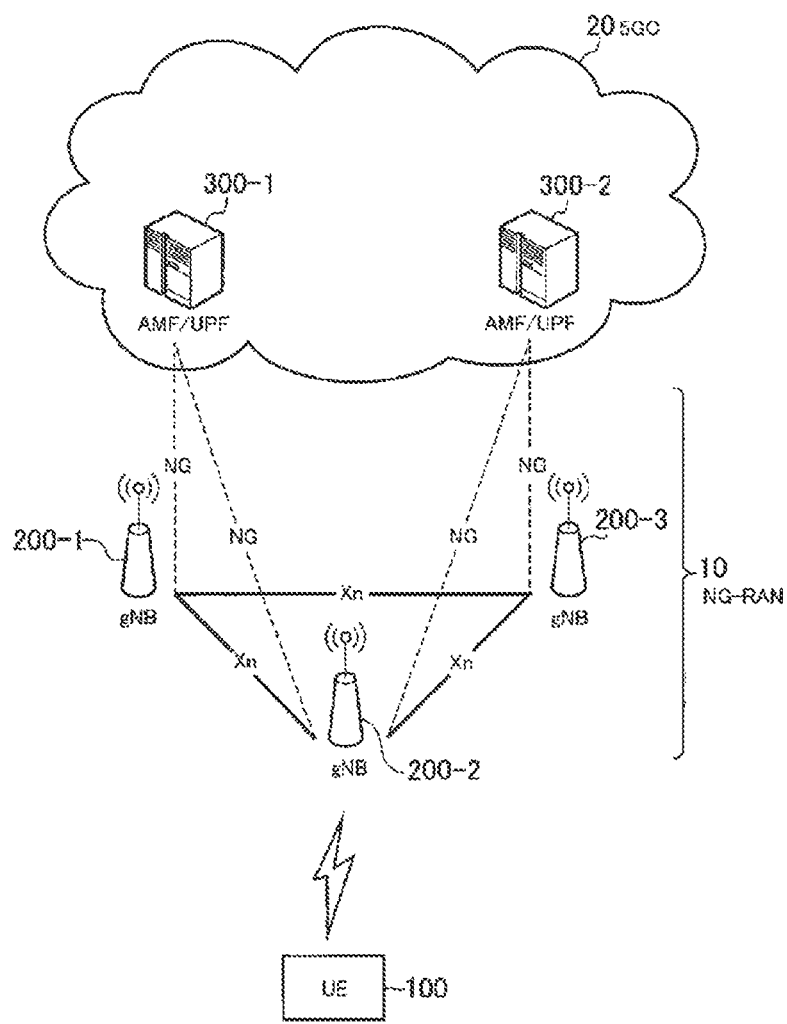
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base station interface. The gNB 200 manages one or more cells. The gNB 200 performs radio communication with the UE 100 that has established a connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource for performing radio communication with the UE 100. One cell belongs to one carrier frequency.

Note that a gNB may be connected to an Evolved Packet Core (EPC) which is an LTE core network, or an LTE base station may be connected to a 5GC. Moreover, the LTE base station may be connected to the gNB via the inter-base station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
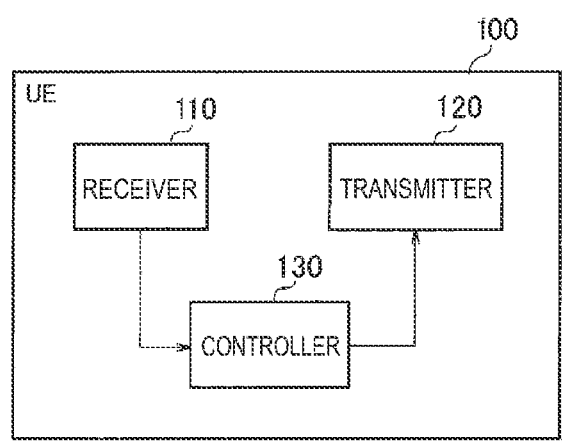
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) output by the controller 130 into a radio signal and transmits the signal from the antenna.

The controller 130 performs various types of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of process.

Figure 3:
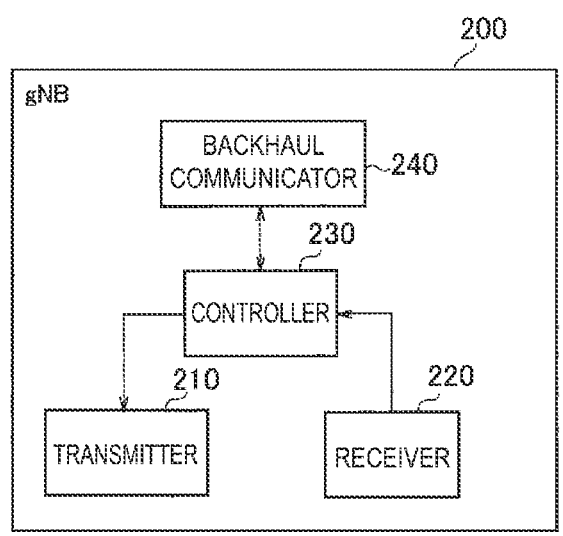
FIG. 3 is a diagram illustrating a configuration of a base station according to the embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of process.

The backhaul communicator 240 is connected to a neighboring base station via the inter-base station interface. The backhaul communicator 240 is connected to the AMF/UPF 300 via the base station to core network interface. Note that the gNB may include a Central Unit (CU) and a Distributed Unit (DU) (i.e., may be functionally divided), and both units may be connected to each other via an F1 interface.

Figure 4:
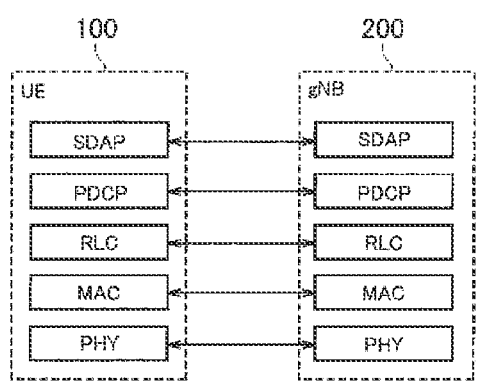
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by hybrid ARQ (Automatic Repeat reQuest) (HARQ), a random access procedure, or the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit by which the core network performs QoS control and a radio bearer that is a unit by which an Access Stratum (AS) performs QoS control. Note that in a case where a RAN is connected to the EPC, SDAP is not necessary.

Figure 5:
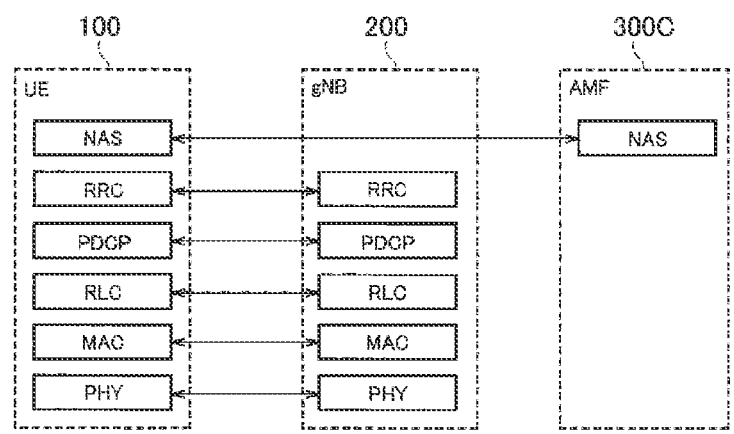
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is a connection (RRC connection) between the RRC of the UE 100 and the RRC of the gNB 200, the UE 100 is in an RRC connected mode. In a case where there is no connection (RRC connection) between the RRC of the UE 100 and the RRC of the gNB 200, the UE 100 is in an RRC idle mode. In a case where the RRC connection is suspended, the UE 100 is in an RRC inactive mode.

The NAS layer located higher than the RRC layer performs session management, mobility management, and the like. NAS signaling is transmitted between the NAS layer of the UE 100 and the NAS layer of the AMF 300.

Note that the UE 100 includes an application layer or the like other than the radio interface protocol.

Transition from RRC Connected Mode to Another Mode

Next, a transition from the RRC connected mode to another mode will be described.

The RRC connected mode and the RRC inactive mode are modes in which an RRC connection for the UE 100 is established. However, the RRC inactive mode is a mode in which an established RRC connection is suspended. Specifically, in the RRC inactive mode, context information for the UE 100 is retained in the gNB 200 and the UE 100. Thus, the UE 100 can smoothly transition to the RRC connected mode by using the retained context information. The RRC idle mode is a mode in which an RRC connection for the UE 100 is not established.

The UE 100 in the RRC idle mode or the RRC inactive mode needs to monitor a downlink control channel only in a cyclic paging occasion, and thus, power consumption of the UE 100 is small. On the other hand, the UE 100 in the RRC connected mode needs to frequently monitor at least the downlink control channel in order to perform data communication, and the power consumption of the UE 100 is large.

Figure 6:
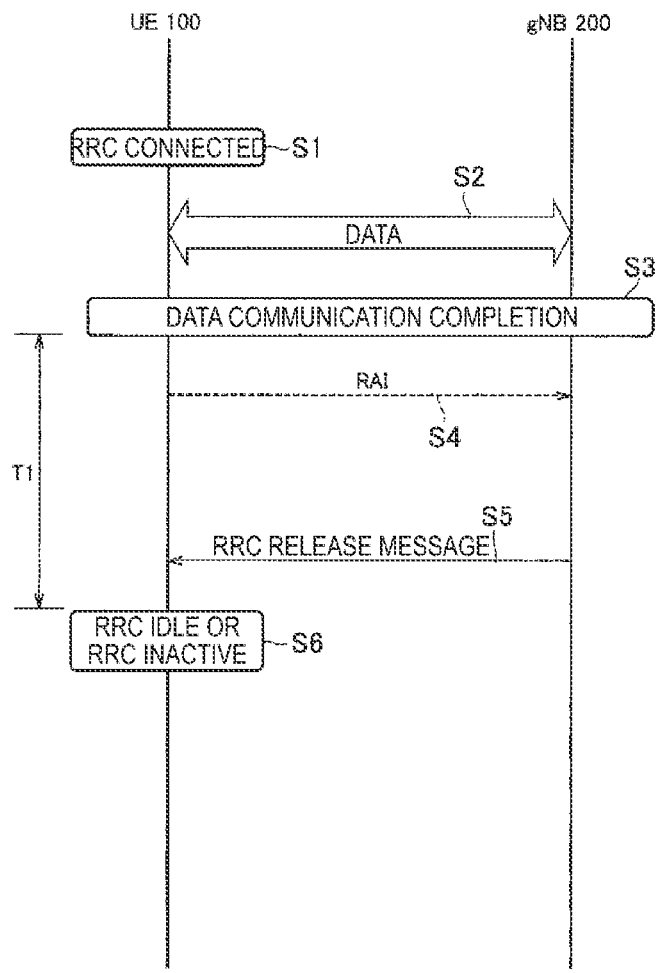
FIG. 6 is a diagram illustrating basic operations related to a transition from an RRC connected mode to another mode.

FIG. 6 is a diagram illustrating basic operations related to the transition from the RRC connected mode to another mode.

As illustrated in FIG. 6, in step S1, the UE 100 is in the RRC connected mode in a cell of the gNB 200. The UE 100 in the RRC connected mode performs data communication with the gNB 200.

In step S2, the UE 100 transmits uplink data to the gNB 200 via a Physical Uplink Shared Channel (PUSCH), and receives downlink data from the gNB 200 via a Physical Downlink Shared Channel (PDSCH).

In step S3, the UE 100 and the gNB 200 complete the data communication. Completion of data communication refers to uplink data transmission completion in a case where only uplink data transmission is performed. Alternatively, completion of data communication refers to downlink data transmission completion in a case where only downlink data transmission is performed. Alternatively, completion of data communication refers to uplink and downlink data transmission completion in a case where uplink and downlink data transmissions are performed.

In step S4, the UE 100 may transmit, to the gNB 200, a Release Assistance Indicator (RAI) which is an indicator indicating that data to be transmitted to the gNB 200 will not occur in the near future. The RAI may be a buffer status report indicating that a buffer size value is zero. The RAI may be enabled only when RAI activation is configured from the gNB 200. However, step S4 is not necessarily required and step S5 may be performed without step S4.

In step S5, the gNB 200 transmits, to the UE 100, an RRC release message which is a type of dedicated RRC message that is transmitted by UE-specific unicast transmission, in response to completion of data communication. In a case where the gNB 200 determines to make the UE 100 transition to the RRC inactive mode, the gNB 200 includes configuration information for the RRC inactive mode (SuspendConfig) in the RRC release message. SuspendConfig includes ran-PagingCycle which is a discontinuous reception (DRX) cycle for the RRC inactive mode, and fullI-RNTI or shortI-RNTI which is an identifier assigned to the UE 100 for the RRC inactive mode. On the other hand, in a case where the gNB 200 determines to make the UE 100 transition to the RRC idle mode, the gNB 200 does not include SuspendConfig in the RRC release message.

In step S6, the UE 100 transitions to the RRC idle mode or the RRC inactive mode, based on the RRC release messages received from the gNB 200. Specifically, the UE 100 transitions to the RRC inactive mode in a case where an RRC release message includes SuspendConfig. On the other hand, the UE 100 transitions to the RRC idle mode in a case where an RRC release message does not include SuspendConfig.

Here, the UE 100 (RRC layer) transitions to the RRC idle mode or the RRC inactive mode at a timing that is the earlier one of a timing at which 60 ms elapses from receiving the RRC message and a timing at which a lower layer (layer 2) sends an acknowledgment in response to the RRC message.

In the basic operations illustrated in FIG. 6, the UE 100 needs to maintain the RRC connected mode despite the data communication completion, for a period T1 from completing the data communication in step S3 to transitioning to the RRC idle mode or the RRC inactive mode in step S6. The power consumption of the UE 100 for the period T1 is wasted power that does not contribute to the transmission and/or reception of data. Therefore, it can be thought that there is room for reduction of the power consumption of the UE 100 by shortening the period T1.

It can be also thought that in a case where, after a long time elapses from the completion of data communication (step S3), the next data communication is initiated, making the UE 100 transition to the RRC idle mode or to the RRC inactive mode is preferable. However, the gNB 200 may not have sufficient criteria to determine whether to make the UE 100 transition to the RRC idle mode or the RRC inactive mode.

First Embodiment

Figure 7:
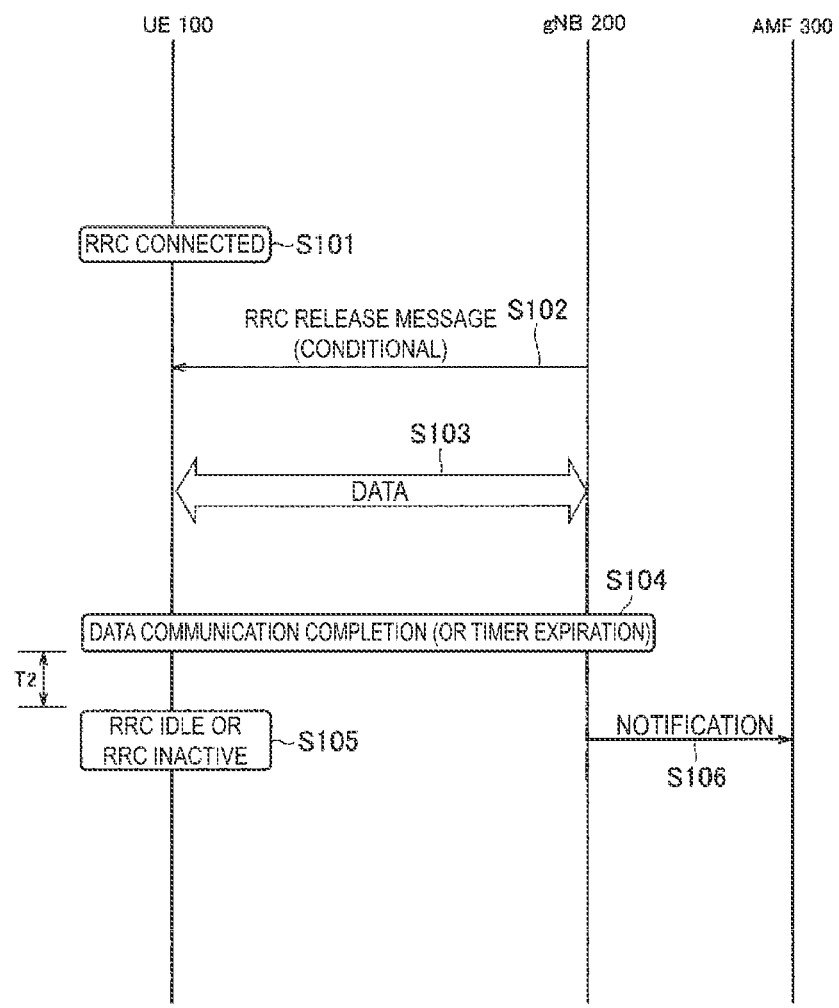
FIG. 7 is a diagram illustrating operations of a mobile communication system according to a first embodiment.

Next, a first embodiment will be described. FIG. 7 is a diagram illustrating operations of a mobile communication system according to the first embodiment.

As illustrated in FIG. 7, in step S101, the UE 100 is in the RRC connected mode in a cell of the gNB 200. The UE 100 in the RRC connected mode performs data communication with the gNB 200.

In step S102, the gNB 200 transmits, to the UE 100, an RRC release message with a condition for releasing or suspending the RRC connection of the UE 100 (hereinafter referred to as a "predetermined condition"). Such a conditional RRC release message may be an RRC release message including condition information specifying the predetermined condition. The conditional RRC release message may be a new RRC release message having a different format from a general RRC release message.

The UE 100 immediately transitions to the RRC idle mode or the RRC inactive mode when the UE 100 receives a general RRC release message. On the other hand, when the UE 100 receives the conditional RRC release message, the UE 100 leaves the transition to the RRC idle mode or RRC inactive mode pending, and maintains the RRC connected mode until the predetermined condition is met.

The predetermined condition may be configured for the UE 100 as configuration information (information element) in the RRC release message, or a predetermined condition defined by communication standards may be configured for the UE 100 in advance at the time of shipping the UE 100. Details of the predetermined condition are described in step S104.

In a case where the gNB 200 determines to make the UE 100 transition to the RRC inactive mode, the gNB 200 includes configuration information for the RRC inactive mode (SuspendConfig) in the RRC release message. On the other hand, in a case where the gNB 200 determines to make the UE 100 transition to the RRC idle mode, the gNB 200 does not include SuspendConfig in the RRC release message.

The UE 100 continuously checks whether the predetermined condition is met in response to reception of a conditional RRC release message from the gNB 200.

In step S103, the UE 100, after receiving the conditional RRC release message, performs data communication with the gNB 200 until the predetermined condition is met. For example, the UE 100 transmits uplink data to the gNB 200 via the PUSCH, or receives downlink data from the gNB 200 via the PDSCH.

In step S104, the UE 100 determines that the predetermined condition has been met. The predetermined condition is any one of conditions 1 to 3 below, or a combination of two or more of the conditions. In a case where the gNB 200 configures a predetermined condition for the UE 100, the gNB 200 may include one or more identifiers of the conditions 1 to 3 in the conditional RRC release message.

(1) Condition 1: The UE 100 completes the uplink data transmission to the gNB 200 (i.e., the last uplink data transmission ends).

For example, in a situation in which the gNB 200 has completed transmission of downlink data to the UE 100 and receives uplink data from the UE 100, the gNB 200 transmits an RRC release message specifying the condition 1 to the UE 100. In this case, the UE 100 is to autonomously transition to the RRC idle mode or the RRC inactive mode upon completion of the uplink transmission.

The completion of the uplink data transmission in the condition 1 may be a condition 1A that the UE 100 transmits, to the gNB 200, information indicating completion of the data transmission. For example, the UE 100 transmits, to the gNB 200, the above-described RAI as a notification of completion of uplink data transmission (end marker). At this end marker transmission, the UE 100 autonomously transitions to the RRC idle mode or the RRC inactive mode.

The completion of the uplink data transmission in the condition 1 may be a condition 1B that the data transmission is completed for an amount of data or a transmission time that is notified in advance between the UE 100 and the gNB 200 before the completion of the data transmission. For example, prior to step S104, the UE 100 notifies the gNB 200 in advance of the amount of uplink data to be transmitted to the gNB 200 or the time to be taken to complete the uplink data transmission to the gNB 200. Such notifications may be made by way of the RAI. Then, the UE 100 autonomously transitions to the RRC idle mode or the RRC inactive mode when completing the data transmission of the amount of data notified in advance to the gNB 200 or the data transmission of the time notified in advance to the gNB 200.

The completion of the uplink data transmission in the condition 1 may be a condition 1C that, after the UE 100 has performed the last uplink data transmission, an acknowledgment (HARQ ACK or ARQ ACK) in response to this uplink data is received from the gNB 200. When receiving the acknowledgment corresponding to the last uplink data transmission from the gNB 200, the UE 100 autonomously transitions to the RRC idle mode or the RRC inactive mode.

The completion of the uplink data transmission in the condition 1 may be a combination of two or more of the conditions 1A to 1C.

(2) Condition 2: The UE 100 completes the downlink data reception from the gNB 200 (i.e., the last downlink data reception ends).

For example, in a situation in which the gNB 200 has completed reception of uplink data from the UE 100 and transmits downlink data to the UE 100, the gNB 200 transmits an RRC release message specifying the condition 2 to the UE 100. In this case, the UE 100 is to autonomously transition to the RRC idle mode or the RRC inactive mode upon completing the downlink data reception.

The completion of the downlink data reception in the condition 2 may be a condition 2A that the UE 100 receives information from the gNB 200, the information indicating the completion of the data transmission. For example, the gNB 200 transmits a notification of completion of the last downlink data transmission (end marker) to the UE 100. At the time of this end marker reception, the UE 100 autonomously transitions to the RRC idle mode or the RRC inactive mode.

The completion of the downlink data reception in the condition 2 may be a condition 2B that the data reception is completed for an amount of data or a reception time that is notified in advance to the UE 100 by the gNB 200 before the completion of the downlink data reception. For example, prior to step S104, the gNB 200 notifies the UE 100 in advance of the amount of downlink data to be transmitted to the UE 100 or the time to be taken to complete the downlink data transmission to the UE 100. Then, the UE 100 autonomously transitions to the RRC idle mode or the RRC inactive mode upon completion of reception of the amount of data notified in advance from the gNB 200 or the reception in the time notified in advance from the gNB 200.

The completion of the downlink data reception in the condition 2 may be a condition 2C that after the UE 100 has performed the last downlink data reception, the UE 100 transmits to the gNB 200, an acknowledgment (HARQ ACK or ARQ ACK) in response to this downlink data. When transmitting, to the gNB 200, the acknowledgment corresponding to the last downlink data transmission, the UE 100 autonomously transitions to the RRC idle mode or the RRC inactive mode.

The completion of the downlink data reception in the condition 2 may be a combination of two or more of the conditions 2A to 2C.

(3) Condition 3: The time specified by way of the RRC release message from the gNB 200 elapses.

For example, the gNB 200 includes a timer value that defines a time for which the UE 100 is made to maintain the RRC connected mode in a conditional RRC release message. The UE 100 starts the timer with the timer value being configured when receiving the RRC release message and autonomously transitions to the RRC idle mode or the RRC inactive mode when the timer expires.

In step S105, the UE 100 transitions to the RRC idle mode or the RRC inactive mode in response to the predetermined condition being met. The UE 100 transitions to the RRC inactive mode in a case where the RRC release message received in step S102 includes SuspendConfig. On the other hand, the UE 100 transitions to the RRC idle mode in a case where the RRC release message does not include SuspendConfig.

On the other hand, in step S106, the gNB 200 determines that the predetermined condition is met and assumes that the UE 100 transitions to a mode selected by the gNB 200 of the RRC idle mode or the RRC inactive mode. Then, the gNB 200 notifies the core network (AMF 300) of the mode of the UE 100 after the transition and an identifier of the UE 100. The notification may be performed on the NG interface.

According to the first embodiment, a period T2 from completing the data communication in step S104 to transitioning to the RRC idle mode or the RRC inactive mode in step S105 can be shortened. Specifically, the period T2 illustrated in FIG. 7 is shorter than the period T1 illustrated in FIG. 6. Thus, the power consumption of the UE 100 can be reduced compared to the basic operations illustrated in FIG. 7.

Modification Example of First Embodiment

Figure 8:
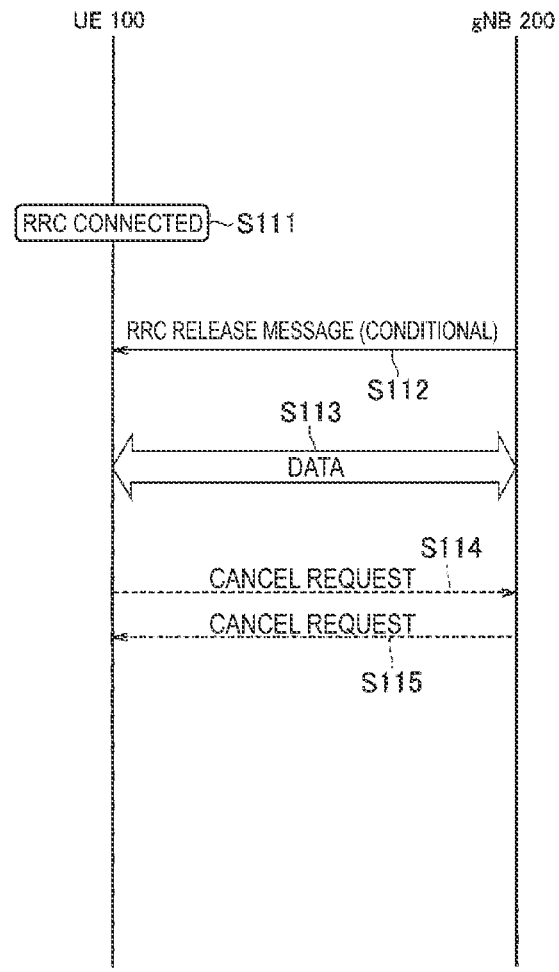
FIG. 8 is a diagram illustrating operations of a mobile communication system according to a modification example of the first embodiment.

Next, a description will be given of differences between the first embodiment described above and a modification example of the first embodiment. FIG. 8 is a diagram illustrating operations of a mobile communication system according to the modification example of the first embodiment.

As illustrated in FIG. 8, steps S111 to S113 are the same as the first embodiment described above.

In the modification example, after receiving a conditional RRC release message from the gNB 200, the UE 100 transmits, to the gNB 200, a cancel request to cancel the releasing or suspending of the RRC connection (step S114), or receives a cancel request from the gNB 200 (step S115). A response to the cancel request may be further transmitted and received. Such signaling may be made by way of an RRC message or a MAC Control Element (CE). The cancel request may include an information element indicating a reason for cancellation.

Thus, even after the conditional RRC release message has been received, the RRC connected mode can be continued to be maintained, such as in a case where data is unexpectedly generated.

Second Embodiment

Figure 9:
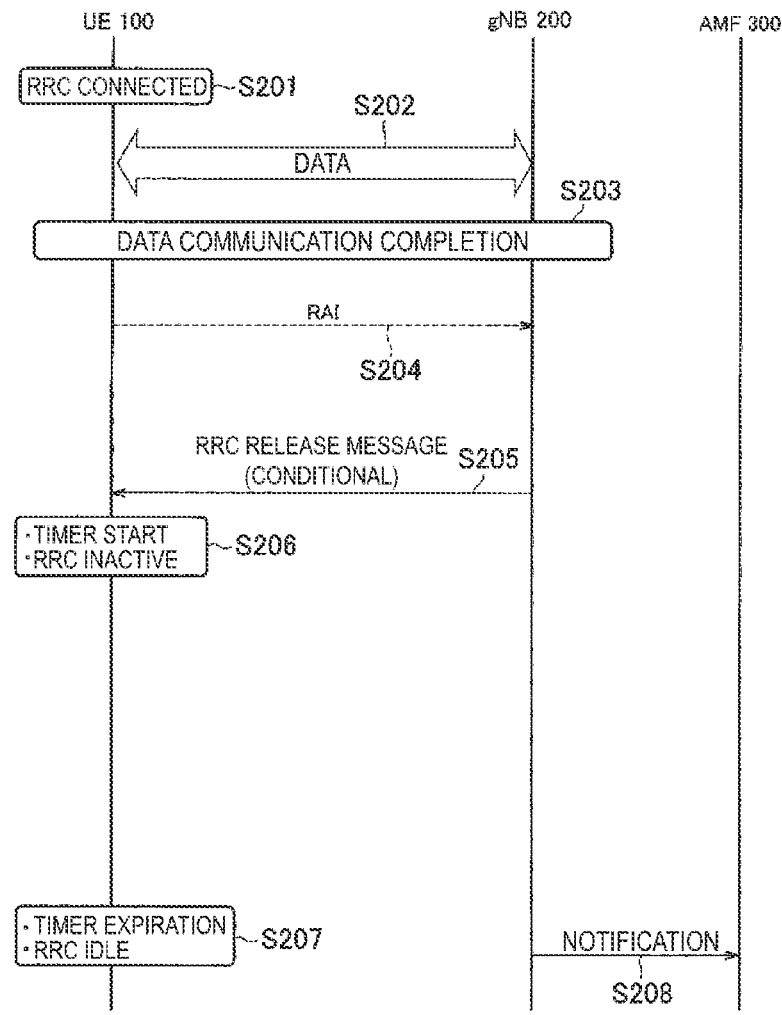
FIG. 9 is a diagram illustrating operations of a mobile communication system according to a second embodiment.
Figure 10:
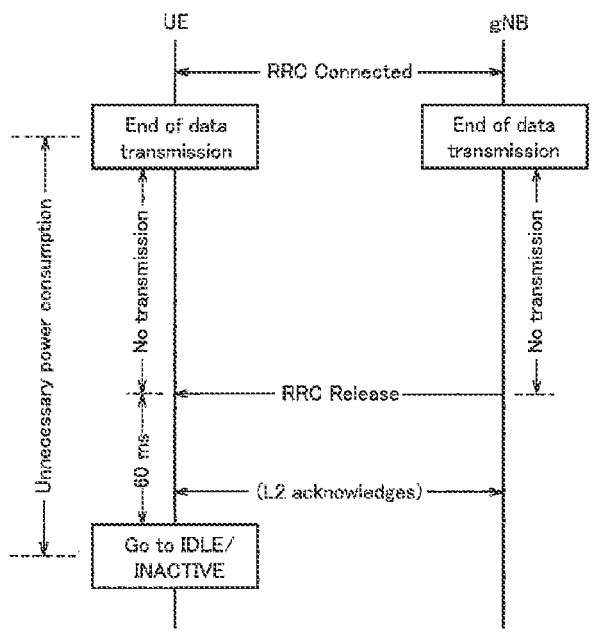
FIG. 10 is a diagram related to a supplementary note.

Next, a difference between a second embodiment and the first embodiment described above will be described. FIG. 9 is a diagram illustrating operations of a mobile communication system according to the second embodiment.

As illustrated in FIG. 9, in step S201, the UE 100 is in the RRC connected mode in a cell of the gNB 200. The UE 100 in the RRC connected mode performs data communication with the gNB 200.

In step S202, the UE 100 transmits uplink data to the gNB 200 via the PUSCH, or receives downlink data from the gNB 200 via the PDSCH.

In step S203, the UE 100 and the gNB 200 complete the data communication. Completion of data communication refers to uplink data transmission completion in a case where only uplink data transmission is performed. Alternatively, completion of data communication refers to downlink data transmission completion in a case where only downlink data transmission is performed. Alternatively, completion of data communication refers to uplink and downlink data transmission completion in a case where uplink and downlink data transmissions are performed.

In step S204, the UE 100 may transmit, to the gNB 200, a RAI which is an indicator indicating that data to be transmitted to the gNB 200 will not occur in the near future. The RAI may be a buffer status report indicating that a buffer size value is zero. The RAI may be enabled only when RAI activation is configured from the gNB 200. However, step S204 is not necessarily required and step S205 may be performed without step S204.

In step S205, the gNB 200 transmits, to the UE 100, an RRC release message with a condition (predetermined condition) for releasing the RRC connection of the UE 100. The RRC release message according to the second embodiment is an RRC release message which makes the UE 100 transition to the RRC inactive mode, and which is associated with the predetermined condition that makes the UE 100 transition to the RRC idle mode.

In the second embodiment, the predetermined condition is a condition that a predetermined time elapses from the reception of the RRC release message or the transition to the RRC inactive mode. The predetermined condition according to the second embodiment may be a condition that a trigger for transitioning to the RRC connected mode does not occur within the predetermined time after the UE 100 transitions to the RRC inactive mode.

Such a conditional RRC release message may be an RRC release message including condition information specifying the predetermined condition. The conditional RRC release message can be a new RRC release message having a different format from the general RRC release message.

In the second embodiment, the conditional RRC release message may include SuspendConfig described above. The conditional RRC release message may also include at least one parameter to adopt after transitioning to the RRC idle mode.

In step S206, the UE 100 transitions to the RRC inactive mode in response to receiving the conditional RRC release message from the gNB 200. The UE 100 starts a timer corresponding to the predetermined time when receiving the conditional RRC release message or transitioning to the RRC inactive mode.

This predetermined time (timer value) may be configured for the UE 100 as the configuration information (information element) in the conditional RRC release message. Alternatively, the predetermined time (timer value) may be configured for the UE 100 as configuration information (information element) in a system information block (SIB) broadcast by the gNB 200. Alternatively, as the predetermined time (timer value), a timer value defined by the communication standard may be configured for the UE 100 in advance at the time of shipping the UE 100.

The UE 100 may stop the timer in a case where a trigger for transitioning to the RRC connected mode occurs while the timer is running. The trigger for transitioning to the RRC connected mode may be the reception by the UE 100 of a paging message from the gNB 200, or the occurrence, in the UE 100, of uplink data to be transmitted. Alternatively, the UE 100 may stop the timer when transitioning to the RRC connected mode after the trigger for transitioning to the RRC connected mode occurs while the timer is running.

The UE 100 may reset the timer value and restart the timer in a case of receiving an indication of timer restart from the gNB 200 while the timer is running. The indication may be included in a RAN paging message transmitted by the gNB 200 or may be included in the system information. Thus, the gNB 200 can control the time for which the UE 100 is maintained in the RRC inactive mode.

Here, the description proceeds under the assumption that the UE 100 has allowed the timer to expire without stopping the timer.

In step S207, the UE 100 autonomously transitions to the RRC idle mode from the RRC inactive mode in response to the timer expiring.

On the other hand, the gNB 200 also manages the timer in the same manner as the UE 100, and assumes that the UE 100 has transitioned to the RRC idle mode in response to the expiration of the timer. Then, in step S208, the gNB 200 notifies the core network (AMF 300) of the UE 100 having transitioned to the RRC idle mode and the identifier of the UE 100. The notification may be performed on the NG interface.

Note that, instead of the timer, the predetermined time may be represented by the number of paging reception occasions (number of times) during the RRC inactive mode. The paging reception occasions occur in a cycle corresponding to ran-PagingCycle in SuspendConfig. For example, the UE 100 may transition from the RRC inactive mode to the RRC idle mode in a case of receiving no paging message in a configured number of paging reception occasions.

According to the second embodiment, even in the case where the gNB 200 does not have sufficient criteria to determine whether to make the UE 100 transition to the RRC idle mode or the RRC inactive mode, the UE 100 autonomously transitions to the RRC idle mode from the RRC inactive mode. This allows the UE 100 to appropriately use the RRC idle mode and the RRC inactive mode.

Other Embodiments

The embodiments above are described mainly for a 5G system (NR), but the operations according to the embodiments may be applied to LTE.

In the embodiments described above, the UE 100 may be a UE for a machine type communication application or an IoT application.

Note that a program causing a computer to execute each of the processes performed by the UE 100 or the gNB 200 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the UE 100 or the gNB 200 may be integrated to configure at least a portion of the UE 100 or the gNB 200 as a semiconductor integrated circuit (chipset, SoC).

An embodiment has been described above in detail with reference to the drawings; however, specific configurations are not limited to those described above, and various design modifications can be made without departing from the gist of the present disclosure.

Supplementary Note

Introduction

The RAN plenary approved the study on NR UE power savings, and the following was defined as an objective initiated by RAN2.

Study on Extension of Higher Layer Procedure for User Equipment Power Savings a) Study on extension of the UE paging procedure based on additional power saving signal/channel/procedure
b) Study on extension of the UE power saving procedure for supporting efficient transition from the RRC connected mode to the RRC idle mode/RRC inactive mode In this supplementary note, problems that may arise in the procedure of transitioning from the RRC connected mode to the RRC idle mode/inactive mode and the direction for solutions for UE power saving will be discussed.

Discussion

As illustrated in FIG. 9, even though the UE can already transition to the idle mode/inactive mode, unnecessary power consumption is caused when the UE remains in the connected mode. Such delay may include a period from the end of data transmission to the RRC release and a period from the reception of the RRC release to the start of the process of transition to the idle mode/inactive mode. Accordingly, in order to reduce the UE power consumption, it is desirable to minimize delay due to the UE unnecessarily maintaining the RRC connected mode.

Proposal 1: RAN2 should study a solution to minimize the period for which the UE unnecessarily maintains the RRC connected mode.

Concerning the former delay, after DL/UL data transmission is completed, the gNB is expected to transmit the RRC release as soon as possible. However, in a case where additional data arrives immediately after the RRC release, the UE needs to re-transition to the RRC connected mode. Such frequent back and forth transitions of the RRC state are undesirable. Accordingly, to better understand when to transmit the RRC release, it may be necessary for the gNB to know whether DL/UL will occur in the near future. In NB-IoT and eMTC, a Release Assistance Indication (RAI) was introduced to inform the eNB of whether the UE holds more data to transmit or receive in the near future by the UE transmitting BRS=0. As one possibility, NR may reuse the concept of RAI as in LTE today. However, in consideration that NR has additional functionality that is not available in LTE (e.g., an inactive state), some extension for existing RAI may be required. Details may be discussed later.

Proposal 2: RAN2 should agree to adopt the concept of Release Assistance Indication (RAI) as a baseline, and the details and possibilities of extension should be further studied.

Concerning the latter delay discussed above, in the current specification, the UE delays the process to transition to the idle mode/inactive mode by 60 milliseconds after the reception of the RRC release message, or optionally, the UE transitions to the idle mode/inactive mode by the acknowledgment of the message from the lower layer. For this purpose, the 60 millisecond delay in LTE takes into account L2 acknowledgment, that is, RLC status reporting and HARQ ACK. This processing delay of the RRC connection release continues from Rel-8, so it should be reviewed if it can be applied to NR. For example, the extended RRC release message can instruct the UE to transition to the idle mode/inactive mode only in a case where the data transmission is terminated (e.g., in a case of a conditional RRC release). Details and other solutions should be further studied.

Finding 1: Currently, the UE does not transition to the idle mode immediately after receiving the RRC release. That is, The UE stands by for 60 milliseconds, or waits for the acknowledgment from the lower layer.

Proposal 3: RAN2 should study a solution to minimize the delay in receiving the RRC release.

The invention claimed is:

1. A communication control method in a mobile communication system, the communication control method comprising:
 receiving, by a user equipment in a Radio Resource Control (RRC) connected mode, an RRC release message from a base station, the RRC release message including a first condition for releasing an RRC connection or a second condition for suspending the RRC connection;
 deferring transitioning the user equipment to an RRC inactive mode or an RRC idle mode until the first condition or the second condition satisfied even after receiving the RRC release message;
 performing, by the user equipment, data communication with the base station until the first condition or the second condition is satisfied even after receiving the RRC release message;
 transitioning the user equipment to an RRC idle mode in response to the first condition being satisfied; and
 transitioning the user equipment to an RRC inactive mode in response to the second condition being satisfied, wherein
 the first condition and the second condition include a condition that the user equipment completes data transmission to the base station.

2. The communication control method according to claim 1, wherein
 the RRC release message includes information specifying the condition, and
 the transitioning includes transitioning the user equipment to the RRC idle mode or the RRC inactive mode in a case where the condition specified by way of the RRC release message is met.

3. The communication control method according to claim 1, wherein
 in a case where the RRC release message includes suspension information indicating suspension of the RRC connection, the transitioning includes transitioning the user equipment to the RRC inactive mode when the condition is met.

4. The communication control method according to claim 1, wherein
 the completion of the data transmission includes a condition that the user equipment transmits information indicating the completion of the data transmission to the base station, or that data transmission is completed for an amount of data or a transmission time that is notified in advance by the user equipment to the base station before the completion of the data transmission.

5. The communication control method according to claim 1, wherein
 the first condition and the second condition include a condition that the user equipment completes data reception from the base station.

6. The communication control method according to claim 5, wherein
 the completion of the data reception includes a condition that the user equipment receives information indicating the completion of the data transmission from the base station, or data reception is completed for an amount of data or a reception time that is notified in advance to the user equipment by the base station before the completion of the data reception.

7. The communication control method according to claim 1, wherein
 the first condition and the second condition include a condition that a time specified by way of the RRC release message from the base station elapses.

8. The communication control method according to claim 1, further comprising:
 transmitting, by the user equipment to the base station, after receiving the RRC release message, a cancel request to cancel releasing or suspending of the RRC connection, or receiving the cancel request from the base station.

9. A user equipment in a mobile communication system, the user equipment comprising:
 a receiver configured to receive, in a Radio Resource Control (RRC) connected mode, an RRC release message from a base station, the RRC release message including a first condition for releasing an RRC connection or a second condition for suspending the RRC connection; and
 deferring transitioning the user equipment to an RRC inactive mode or an RRC idle mode until the first condition or the second condition is satisfied even after receiving the RRC release message;
 a controller configured to perform data communication with the base station until the first condition or the second condition is satisfied even after receiving the RRC release message, wherein
 the controller is configured to:
 make the user equipment transition to an RRC idle mode in response to the first condition being satisfied; and make the user equipment transition to an RRC inactive mode in response to the second condition being satisfied, wherein
the first condition and the second condition include a condition that the user equipment completes data transmission to the base station.

10. A communication control method in a mobile communication system, the communication control method comprising:
receiving, by a user equipment in a Radio Resource Control (RRC) connected mode, an RRC release message from a base station, the RRC release message indicating suspension of an RRC connection and including a predetermined condition for transitioning an RRC inactive mode autonomously to an RRC idle mode;
transitioning the user equipment to the RRC inactive mode in response to the user equipment receiving the RRC release message; and
after receiving the RRC release message including the predetermined condition, transitioning the user equipment in the RRC inactive mode autonomously to the RRC idle mode in response to the predetermined condition being satisfied, wherein
the predetermined condition includes a condition that a trigger for the user equipment to transition to the RRC connected mode does not occur within a predetermined time after the user equipment transitions to the RRC inactive mode.

11. The communication control method according to claim 10 further comprising:
determining, by the base station, whether the predetermined condition is met; and
transmitting, by the base station, a notification indicating that the user equipment transitions to the RRC idle mode to a core network, in a case where the predetermined condition is determined to be met.

12. A user equipment in a mobile communication system, the user equipment comprising:
a receiver configured to receive, in a Radio Resource Control (RRC) connected mode, an RRC release message from a base station, the RRC message indicating suspension of an RRC connection and including a predetermined condition for transitioning an RRC inactive mode autonomously to an RRC idle mode; and
a controller configured to make the user equipment transition to the RRC inactive mode in response to receiving the RRC release message, wherein
the controller is configured to autonomously make the user equipment transition from the RRC inactive mode to the RRC idle mode in response to the predetermined condition being satisfied after receiving the RRC release message including the predetermined condition, wherein
the predetermined condition includes a condition that a trigger for the user equipment to transition to the RRC connected mode does not occur within a predetermined time after the user equipment transitions to the RRC inactive mode.

* * * * *